No. 615,917. Patented Dec. 13, 1898.
R. SHULTZ.
WHEEL AND TRACK BRAKE FOR RAILWAY CARS.
(Application filed Dec. 18, 1897. Renewed Oct. 6, 1898.)
(No Model.) 3 Sheets—Sheet 1.
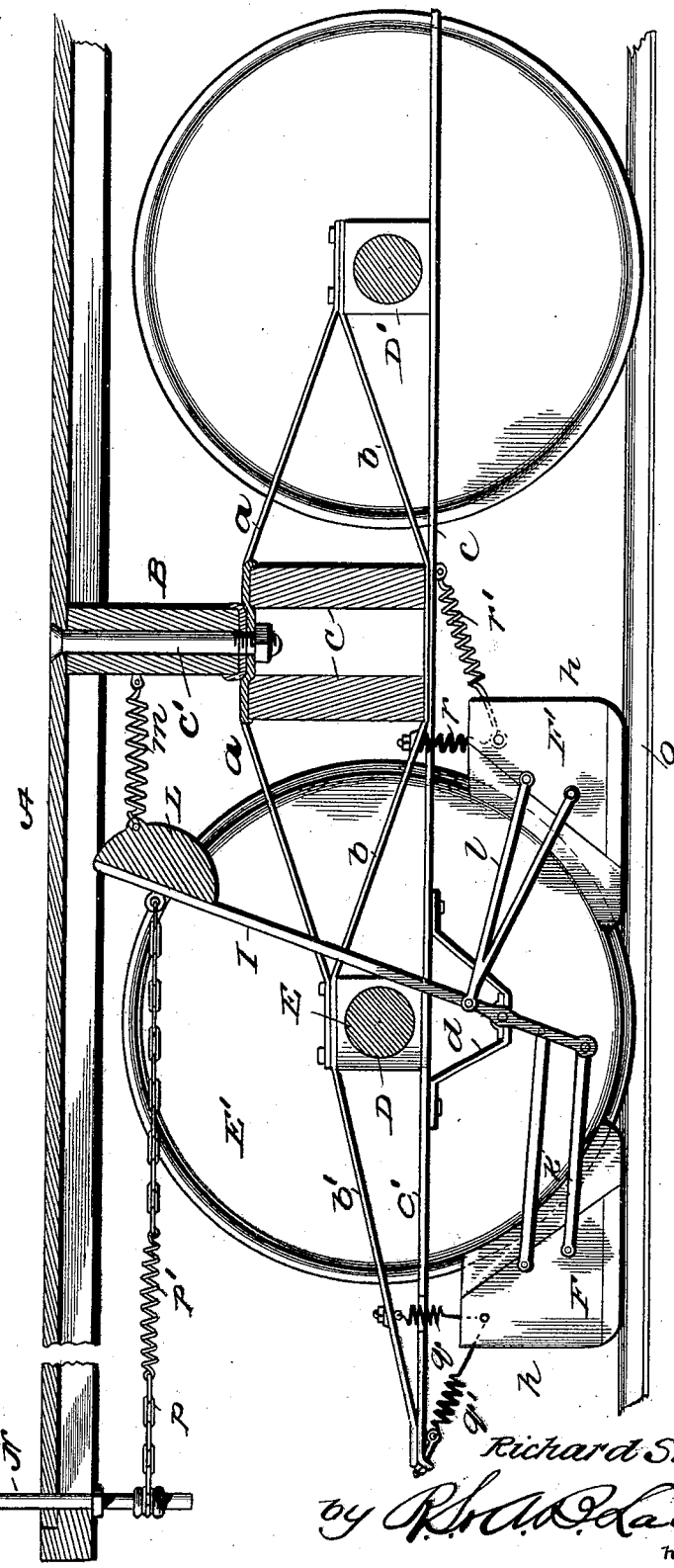

No. 615,917. Patented Dec. 13, 1898.
R. SHULTZ.
WHEEL AND TRACK BRAKE FOR RAILWAY CARS.
(Application filed Dec. 18, 1897. Renewed Oct. 6, 1898.)
(No Model.) 3 Sheets—Sheet 2.
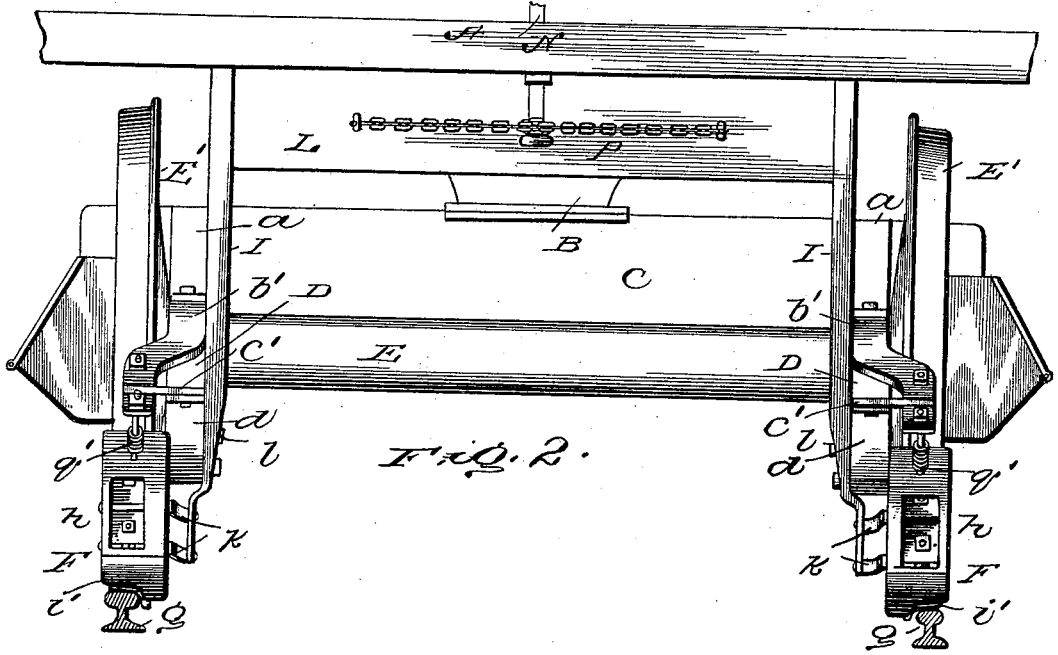
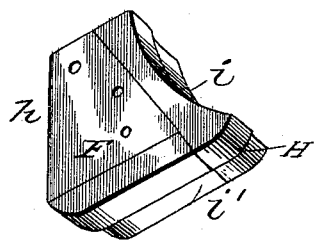
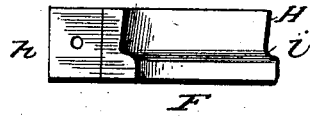
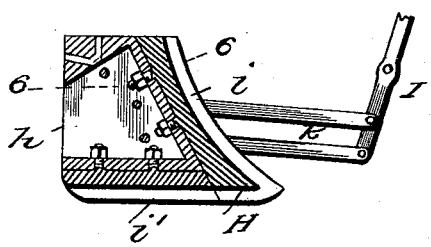
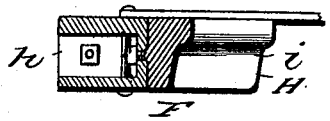
Witnesses:
Inventor
Richard Shultz
by R. S. & A. B. Lacey,
his Attorneys
THE NORRIS PETERS CO., PHOTO-LITHO., WASHINGTON, D. C.

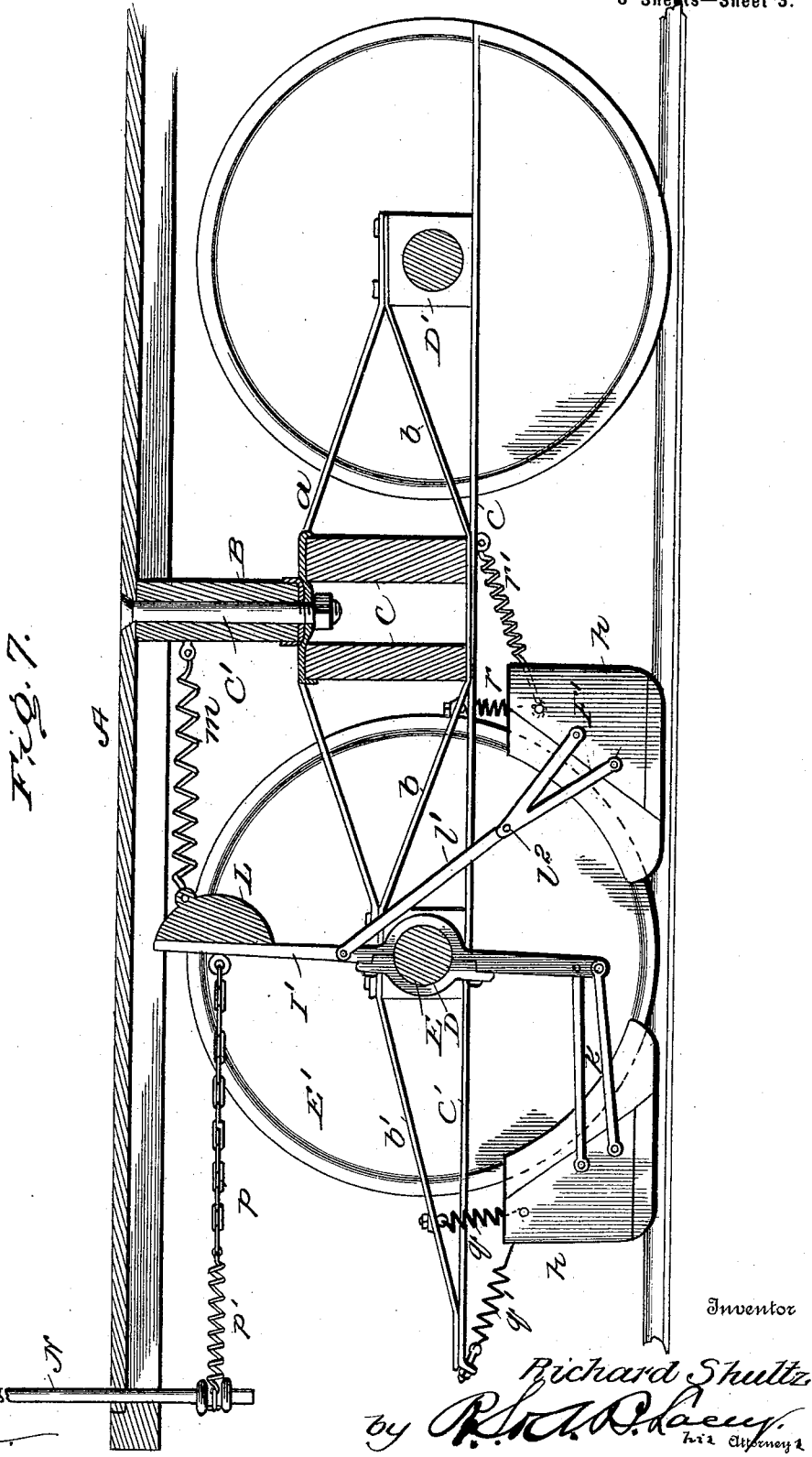

UNITED STATES PATENT OFFICE.

RICHARD SHULTZ, OF DAVIS, WEST VIRGINIA.

WHEEL AND TRACK BRAKE FOR RAILWAY-CARS.

SPECIFICATION forming part of Letters Patent No. 615,917, dated December 13, 1898.

Application filed December 18, 1897. Renewed October 6, 1898. Serial No. 692,863. (No model.)

*To all whom it may concern:*

Be it known that I, RICHARD SHULTZ, a citizen of the United States, residing at Davis, in the county of Tucker and State of West Virginia, have invented certain new and useful Improvements in Wheel and Track Brakes for Railway-Cars; and I do hereby declare the following to be a full, clear, and exact description of the invention, such as will enable others skilled in the art to which it appertains to make and use the same.

This invention relates to improvements in wheel and track brakes for street and railway cars; and its object is to provide a novel form of brake-shoe and simple, powerful, and effective mechanism for applying and releasing the brakes.

With this and other objects in view the invention consists in the novel features of construction, combination, and arrangement of parts hereinafter more fully described, and specifically set forth in the appended claims.

In the accompanying drawings, Figure 1 is a longitudinal section through the floor of a car and a wheel-truck, showing my improved brake mechanism at one side of same. Fig. 2 is an end view showing the complete brake mechanism. Fig. 3 is an isometrical perspective view of the brake block and shoe; Fig. 4, a top plan view of same. Figs. 5 and 6 are respectively a vertical longitudinal section and a horizontal section of the brake block and shoe, the section in the latter figure being taken on line 6 6 of Fig. 5; and Fig. 7, a view similar to Fig. 1, but showing a modified construction of brake mechanism.

The floor-frame A of the car is mounted at each end on a bolster B, to which the transverse frame C of the wheel-truck is swiveled by the king-bolt C' in the usual manner. As the brake mechanism is connected with and supported by the truck the parts of the latter will be referred to first and then the conconstruction and mode of operation of the brake mechanism described, and inasmuch as the parts of the brake mechanism are arranged in duplicate at opposite sides of the truck a description of the parts at one side will suffice for both.

The transverse frame C of the truck is supported at each side by diagonal braces $a$ $b$ and a horizontal tie plate or rod $c$, connecting between the axle-boxes D D', the outer ends $b'$ $c'$ of the brace $b$ and tie-plate being extended beyond the said front axle-box D and connected in the usual manner. A bracket $d$ is secured to and hangs pendent from the said tie-plate.

E represents the front axle of the truck, on which are mounted the wheels E'.

F F' represent the brake-shoes, which are arranged to bear upon the track-rail $g$ and upon the opposite side of the periphery of the wheel. Each brake-shoe consists of an approximately triangular-shaped box-casting $h$, open at the front, to which is bolted a detachable substantially L-shaped shoe proper, H, consisting of a wheel-bearing portion $i$ and track-bearing portion $i'$, said portions being curved and flanged to correspond to the configuration of the parts on which they are adapted to bear and to retain their proper position thereon. The shoe thus constructed when worn out may be readily detached and a new shoe substituted therefor.

I represents a brake-lever fulcrumed adjacent to its lower end to the bracket $d$, and the short lower end of this lever is connected to the brake-shoe F by two link-bars $k$ and the long end thereof just above its fulcrum-point to the brake-shoe F' by a link-bar $l$. When this lever is moved forwardly the brake-shoes will be applied, and when moved rearwardly the brake-shoes will be released. The two levers at opposite sides of the truck-frame are connected to move in unison by a transverse bar L. Connecting between this bar and the bolster B is a spiral spring $m$, which serves to retract the levers. The levers are adapted to be moved simultaneously to apply the brake-shoes by a shaft N on the floor-platform A. This shaft is provided at its upper end with a hand-wheel $o$, by which it may be rotated, and is connected to the bar L by a chain $p$. If desired, this chain may be provided with an elastic section $p'$ in the form of a spring adapted to permit the lever to have freedom of movement when the brakes are first applied and the centrifugal force caused by the rapid rotation of the wheels tends to throw the brake-shoes off. It will be seen that when the chain is wound up on the shaft the brake-levers will be moved forward and the brake-shoes applied, and that when the chain is unwound the spring m will retract or draw the lever backward and release the brake-shoes.

The brake-shoe F is supported by stiff spiral springs q q', secured, respectively, to the front extensions b' c' of the brace b and tie-plate c, while the brake-shoe F' is supported by similar springs r r', secured to said brace and tie-plate in rear of the wheel E'. The function of these springs is to normally draw the brake-shoes outward and upward out of contact with the brake and wheel. From the above description the construction and mode of operation of the brake mechanism shown in Figs. 1 to 6, inclusive, will be clearly understood.

In the modification shown in Fig. 7 the construction is substantially the same, the only difference being that the lever I' is fulcrumed to the axle E and the link l' is extended and pivoted at l². To this end the lever is formed with a semicircular bend s to partially encompass the axle and is held thereon by a semicircular clip or coupling-piece t.

I desire it understood that changes in the form, proportion, and minor details of construction may be made within the scope of the invention without sacrificing any of the advantages thereof.

Having thus fully described my invention, what I claim as new and useful, and desire to secure by Letters Patent, is—

1. In brake mechanism, the combination of a pair of brake-shoes adapted to engage a wheel and track-rail, springs supporting said shoes and adapted to normally hold the same out of contact, a pivoted brake-lever, connections between the shoes and lever, a spring connected with the lever and adapted to retract the same, and means for moving the lever against the tension of said latter spring to apply the brake-shoes, substantially as described.

2. In brake mechanism, the combination of a pair of spring-supported brake-shoes adapted to engage a wheel and track-rail, a pivoted operating-lever, links connecting the brake-shoes and lever, a spring for retracting the lever, an operating-shaft, and a chain connecting said shaft and lever and provided with an elastic section, substantially as described.

3. In a car-brake mechanism, the combination of a car, a wheel-truck frame swiveled thereto a pair of brake-shoes adapted to engage a wheel and rail, springs connected with the truck-frame and supporting said shoes, a vertical brake-lever fulcrumed to said frame, links directly connecting the brake-shoes and lever, a spring connecting between the lever and bolster and adapted to normally hold the lever retracted, an operating-shaft on the car, and a chain connecting the shaft and brake-lever, substantially as described.

4. In a car-brake mechanism, the combination of a car, a wheel-truck frame swiveled thereto, two sets of brake-shoes, each comprising a pair of shoes adapted to bear on opposite sides of the periphery of a wheel, a pair of vertical brake-levers, one arranged at each side of the truck-frame and pivoted thereto, links directly connecting each pair of brake-shoes to one of the brake-levers, springs supporting each brake-shoe and normally holding same out of contact with the wheel, a transverse bar connecting said brake-levers to move in unison, a spring connecting the bolster of the truck-frame with said bar to normally hold the levers retracted, an operating-shaft on the car, and a chain connecting the shaft and transverse bar and provided with an elastic section, substantially as described.

In testimony whereof I affix my signature in presence of two witnesses.

RICHARD SHULTZ.

Witnesses:
N. G. KEIM,
GEO. A. MAYER.